(12) United States Patent
Dispensa et al.

(10) Patent No.: US 8,229,853 B2
(45) Date of Patent: Jul. 24, 2012

(54) DYNAMIC ITINERARY-DRIVEN PROFILING FOR PREVENTING UNAUTHORIZED CARD TRANSACTIONS

(75) Inventors: Jean-Claude Dispensa, St Jeannet (FR); Philippe Gregoire, La Gaude (FR); Dominique Picard, Saint-Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 12/211,151

(22) Filed: Sep. 16, 2008

(65) Prior Publication Data
US 2010/0023455 A1 Jan. 28, 2010

(30) Foreign Application Priority Data
Jul. 24, 2008 (EP) .................................. 08305418

(51) Int. Cl.
*G06Q 40/00* (2006.01)
(52) U.S. Cl. ........................................... 705/44; 705/35
(58) Field of Classification Search .................... 705/44, 705/35
See application file for complete search history.

(56) References Cited

U.S. PATENT DOCUMENTS

| | | | |
|---|---|---|---|
| 6,259,405 B1 * | 7/2001 | Stewart et al. | 342/457 |
| 6,609,658 B1 * | 8/2003 | Sehr | 235/384 |
| 2002/0169720 A1 | 11/2002 | Wilson et al. | |
| 2003/0055786 A1 | 3/2003 | Smith, Jr. et al. | |
| 2006/0041504 A1 | 2/2006 | Howard et al. | |
| 2007/0057039 A1 | 3/2007 | Carlson et al. | |
| 2007/0119919 A1 | 5/2007 | Hogg et al. | |

* cited by examiner

*Primary Examiner* — Lindsay M. Maguire
(74) *Attorney, Agent, or Firm* — Schmeiser, Olsen & Watts; John Pivnichny

(57) ABSTRACT

A method and system for preventing unauthorized card transactions via dynamic itinerary-driven profiling. Authorization record(s) including authorized geographic locations and authorized periods of time are received from a travel reservation system (TRS). The authorization record(s) identify an itinerary specified by a travel booking(s) purchased via the TRS using a debit or credit card. The itinerary specifies that the cardholder is scheduled to be in the authorized geographic locations for the authorized periods of time. In response to receiving a request for an authorization of a card transaction, a location and date associated with the card transaction are retrieved from the request. The card transaction is rejected based on a determination that the retrieved location is not within the authorized geographic locations and/or the retrieved date is not within the authorized periods of time. A notification of the retrieved location and retrieved date is logged and displayed.

18 Claims, 7 Drawing Sheets

| Card-ID | User name | Allow | Country/URL | Town | Period | Trip-ID | Cap | Comment |
|---|---|---|---|---|---|---|---|---|
| 123456789 | P. Dupont | 1 | 33 | Paris | 01/07 – 01/08 | ID_1 | 0 | |
| 123456789 | P. Dupont | 1 | http://www.acme.com | 999 | 12-2007 | | 300 | |
| 123456789 | P. Dupont | 1 | 39 | Milano | 01/08-15/08 | ID_2 | 0 | |
| 123456789 | P. Dupont | 0 | 999 | | | | | Deny others |

DYNAMIC ITINERARY-DRIVEN PROFILING FOR PREVENTING UNAUTHORIZED CARD TRANSACTIONS

FIELD OF THE INVENTION

The present invention relates to a data processing method and system for preventing unauthorized card transactions and more particularly to a technique for preventing unauthorized credit card or debit card transactions via dynamic travel itinerary-driven profiling.

BACKGROUND OF THE INVENTION

A common fraudulent use of a credit or debit card is to steal the card in a location close to a country's border and use the card shortly thereafter in a neighboring country. One reason for the prevalence of this type of fraud is that foreigners on vacation often do not know the procedure for opposing a card. Moreover, compared to other card cancellations, cross-border card cancellation may take additional time to be processed and transmitted, thereby providing extra time for fraudulent use. Known credit and debit card fraud prevention systems that allow a cardholder to specify criteria for limiting usage of a card place an excessive burden on the cardholder to enter all required data, including data that is already present in other systems. Furthermore, the known systems for preventing fraudulent use of credit and debit cards lack the flexibility to conveniently and quickly address changing travel itineraries. Thus, there exists a need to overcome at least one of the preceding deficiencies and limitations of the related art.

SUMMARY OF THE INVENTION

The present invention provides a computer-implemented method of preventing an unauthorized card transaction via dynamic travel itinerary-driven profiling. A first computing system receives one or more itinerary-authorization records (hereinafter referred to as authorization records) from a travel reservation system (TRS) executing on a second computing system. Each authorization record includes an identifier of a cardholder to whom a card is issued, an identifier of the card, one or more identifiers that specify an authorized geographic location, an identification of a travel itinerary associated with a trip to be taken by the cardholder, an authorized period of time, and an authorization indicator that indicates whether or not a usage of the card in the authorized geographic location in the authorized period of time is granted. The card is a credit card or a debit card. The card is used by the cardholder for a purchase, via the TRS, of one or more travel tickets or other geo-localized travel bookings such as hotel reservations, concert tickets, attraction tickets, etc. that specify the travel itinerary in full or some of the itinerary's elements. The travel itinerary specifies that in the trip the cardholder is scheduled to be in one or more authorized geographic locations for one or more corresponding authorized periods of time. The itinerary may be specified by multiple authorization records, where each authorization record describes an individual waypoint of the itinerary (i.e., one authorized geographic location) and the waypoint's scheduled timeframe (i.e., one authorized period of time), and may optionally include an indication of a timing tolerance and/or an indication of a geographic tolerance. In response to receiving the one or more authorization records, the first computing system stores the authorization record(s) in a profile table included in a database that resides on a computer data a database that resides on a computer data storage unit. After having stored the authorization record, the first computing system receives a request for an authorization of a card transaction from a third-party requester system that is initiated via a usage of the card. In response to receiving the request for the card transaction authorization, the first computing system retrieves from the request the identifier of the card, an identifier of a location (a.k.a. "retrieved location") in which the card transaction is initiated and a date (a.k.a. "retrieved date") on which the card transaction is initiated. The first computing system determines a rejection condition or an acceptance condition. The rejection condition is determined by (1) comparing the retrieved date to one or more time periods indicated in one or more corresponding authorization records included in the profile table, where each time period is the corresponding authorization record's authorized period of time that may be extended by the optional timing tolerance, (2) retrieving one or more authorization records from the profile table, where each of the one or time periods indicated by the one or more retrieved authorization records includes the retrieved date based on the comparison in step (1), (3) comparing the retrieved location to one or more geographic footprints indicated in the one or more authorization records retrieved in step (2), where the one or more geographic footprints are associated with the one or more authorization records retrieved in step (2) in a one-to-one correspondence, and where each of the one or more geographic footprints is the corresponding authorization record's authorized geographic location that may be extended by the optional geographic tolerance, and (4) determining that none of the one or more geographic footprints includes the retrieved location. In response to determining the rejection condition, the first computing system rejects the card transaction and notifies the third-party requester system of requester system of the rejection condition. After determining the rejection or acceptance condition, the first computing system stores an audit record of the parameters that have led to determining the rejection or acceptance condition. The audit record includes the retrieved location and the retrieved date, as well as the identification of the card and an identification of the third-party requester system. The audit record is stored in a database residing in a computer data storage device (a.k.a. computer data storage unit) coupled to a computing system (e.g., the first computing system). The first computing system sends a notification for display on a display device. The notification includes the retrieved location and the retrieved date.

A system, computer program product, and process for supporting computing infrastructure corresponding to the above-summarized method are also described and claimed herein.

BRIEF DESCRIPTION OF THE DRAWINGS

FIG. 2 is an example of a profile table included in the system of FIG. 1, in accordance with embodiments of the present invention.

DETAILED DESCRIPTION OF THE INVENTION

Overview

The present invention prevents unauthorized use of a credit card or a debit card by dynamically and automatically specifying transaction parameters related to a cardholder's travel itinerary. The specified transaction criteria (a.k.a. profiling data) include a geographic area and a period of time in which card transactions are allowed to be completed. The geographic area and period of time are automatically received from a travel reservation system (TRS). The TRS generates the geographic area and the period of time based on the cardholder's itinerary that is included in one or more geo-localized travel bookings that the cardholder purchased through the TRS (e.g., purchase of travel tickets such as airline tickets, purchase of tickets to an attraction or an event such as a fair or a concert, reservations for a hotel or other accommodations, etc.). The present invention approves or rejects a card transaction based on the profiling data, where the card card transaction may include any type of payment including, for example, a purchase at a shop, a purchase via an e-commerce website, and a withdrawal of cash from a cash dispenser.

As used herein, "card" refers to either a credit card or a debit card. As used herein, a cardholder is defined as a person to whom a card is issued (i.e., an owner of a card). As used herein, a card transaction is defined as an exchange of goods or services, or a transfer of cash that is initiated by a usage of a credit card or a debit card. As used herein, an itinerary or travel itinerary is defined as a plan for a trip, where the plan includes one or more geographic locations and one or more time periods associated with the one or more geographic locations in a one-to-one correspondence, and where each geographic location is a stopover or a destination of the trip and each time period indicates a time of arrival at and a time of departure from the corresponding geographic location. As used herein, a geo-localized travel booking is defined as a purchase or a reservation of travel-related goods that are associated with an itinerary.

Figure 1:
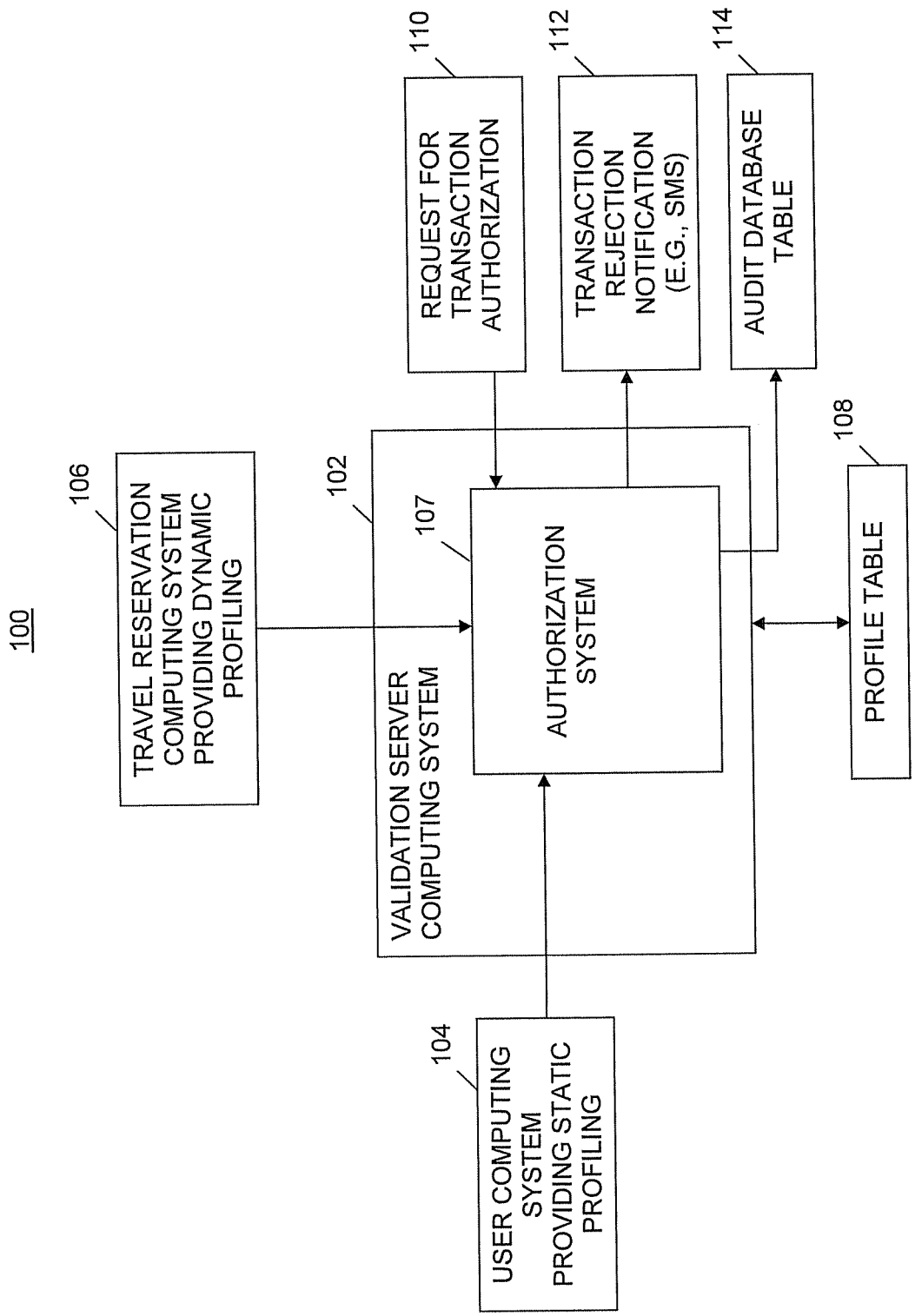
FIG. 1 is a block diagram of a system for preventing unauthorized card transactions via dynamic itinerary-driven profiling, in accordance with embodiments of the present invention.

System for Preventing Unauthorized Card Transactions via Dynamic Itinerary-Driven Profiling FIG. 1 is a block diagram of a system for preventing unauthorized card transactions via dynamic itinerary-driven profiling, in accordance with embodiments of the present invention. System 100 may include a validation server computing system 102, a user computing system 104 and one or more travel reservation computing systems 106. Validation server computing system 102 includes a software-based authorization system 107 that authorizes or rejects a card transaction based on geographic and time-based profiling data. Authorization system 107 receives static profiling data from user computing system 104 and dynamic profiling data from travel travel reservation computing system 106. Computing systems 104, 106 may provide profiling information to validation server 102 via one or more computer networks (not shown). Authorization system 107 accepts business-to-business connections to travel reservation computing system 106.

The dynamic profiling data provided by travel reservation computing system 106 includes travel itinerary information pertaining to a trip to be taken by a cardholder. System 100 includes an interface and format specification (e.g., eXtensible Markup Language (XML) or other Electronic Document Interchange format) for messages received from computing system 106 that include the travel itinerary information. The travel itinerary information sent by computing system 106 includes times and places that describe all legs and stopovers of the cardholder's trip, as well as details about the cardholder's identity.

System 100 also includes a software module (not shown) that integrates the TRS and communicates with the validation server 102. This module's role is to gather the cardholder's trip details and to transmit the trip details to authorization system 107. The transmission of the trip details may be automatically triggered by authorization rules in the cardholder's profile. For example, an authorization rule may indicate that trip details are to be sent to authorization system 107 in response to each purchase of air travel tickets by the cardholder and to automatically authorize usage of the cardholder's card in the scope (i.e., the geographic area(s) and the time window(s)) of the trip specified by the purchased air travel tickets.

In one embodiment, authorization system 107 may be directed by the cardholder to enforce fine-grained authorization rules based on trip details received from computing system 106. For example, an authorization rule may state that a purchase is authorized (or forbidden) in connecting flight airports. As another example, an authorization rule may be refined by specifying a time window tolerance (i.e., timing tolerance) (e.g., a tolerance of ± mm minutes). An authorization rule may also be refined by specifying a geographic tolerance provided by any geographical operation applied to extend a geographic area included in the authorized geographic location indicated by the authorization rule (e.g., a radius in miles around a specified point or a geographical buffer around a specified area).

In one embodiment, authorization system 107 may take real-time flight information as input to adjust a cardholder's authorization scheme based on how the trip actually proceeds. For example, if a flight is delayed, the connecting airport time window is adjusted accordingly in real time so that a purchase in the connecting airport is authorized (or forbidden) based on the adjusted time window.

System 100 may also provide a web-based user interface (not shown) to enable the cardholder to review and modify the cardholder's current travel-related profiling data.

Authorization system 107 may store the received static and dynamic profiling data (e.g., authorization records) in profile table 108 that resides in a computer data storage unit (not shown) coupled to validation server 102. A request 110 (a.k.a. transaction authorization request) for an authorization of a card transaction is received by authorization system 107 from a third-party requester system (not shown). If the request 110 is rejected, authorization system 107 generates a notification 112 of the rejection and stores an audit record of the rejection in audit database table 114. Audit database table 114 is a table included in a database that resides in a computer data storage unit (not shown). In one embodiment, the computer data storage unit that stores profile table 108 is the same as the computer data storage unit that stores audit database table 114. In another embodiment, the computer data storage unit storing profile table 108 is different from the computer data storage unit storing audit database table 114. In one embodiment, the generated notification 112 is a message (e.g., a text message using the Short Message Service (SMS) protocol)

sent to the cardholder for display on a display device to inform the cardholder of an unauthorized attempt to use the cardholder's card. In one embodiment, the notification 112 is displayed on a display device coupled to user computing system 104. The functionality of the components of system 100 is further described below relative to FIGS. 3A-3B, FIG. 4 and FIG. 5.

FIG. 2 is an example of the profile table included in the system of FIG. 1, in accordance with embodiments of the present invention. Sample profile table 200 includes the following columns:

Card-ID: Each entry in the Card-ID column is an identification of a credit card or debit card. A single card may be associated with multiple data rows (i.e., authorization records or authorization rules) of table 200.

User name: Each entry in the User name column is a name or other identifier of a cardholder.

Allow: An indication of whether a transaction for the card identified in Card-ID is allowed or rejected if other criteria in the Country/URL, Town, Period and Cap is satisfied. For example, a value of 1 in the Allow column indicates that the card transaction is allowed if the other criteria in the same row of the profile table are satisfied.

Country/URL: Each entry in the Country/URL column is either an identifier of a country or a Uniform Resource Locator (URL). To satisfy the criteria associated with the Allow indicator and for a card identified in Card-ID, the card transaction must take place at a physical (i.e., offline) entity (e.g., cash dispenser or a "bricks and mortar" shopping location) located in a country indicated in the Country/URL column or the card transaction must take place through an e-commerce website whose URL address is specified in the Country/URL column. As one example, a cardholder may authorize usage of a card in France during the time period of July 1 to August 1 by including an indicator in the Allow column that indicates an allowance of a card transaction, an indicator for France in the corresponding Country/URL column, and a range of dates of July 1 to August 1 in the corresponding Period column (see below). As another example, the cardholder may automatically reject usage of a card in Italy during the time period of July 1 to August 1 by including a rejection indicator in the Allow column, an indicator for Italy in the corresponding Country/URL column, and a range indicating July 1 to August 1 in the Period column.

Town: Each entry in the Town column is a name or other identifier of a town, city or other geographic unit within the country identified in Country/URL. To satisfy the criteria associated with the Allow indicator and for a card identified in Card-ID, the card transaction must must take place in a geographic unit specified in the Town column. In one embodiment, an entry in the Town column includes an indication of a town, city or other geographic unit along with a geographic tolerance that extends the geographic area of the town, city or other geographic unit (e.g., an identification of a point and a radius around the point, an indication of a polygon that includes a geographic buffer around the border of the town, or an indication of a city and suburbs of the city).

Period: Each entry in the Period column is a period of time (e.g., a range of dates). To satisfy the criteria associated with the Allow indicator and for a card identified in Card-ID, the card transaction must tale place within a period of time specified in the Period column.

Trip-ID: Each entry in the Trip-ID column is an identifier of a trip to be taken or being taken by the cardholder. Data from the itinerary of the trip is received by authorization system 107 (see FIG. 1) from travel reservation computing system 106 (see FIG. 1).

Cap: Each entry in the Cap column is a maximum monetary amount associated with card transactions. To be an allowed card transaction for a card identified in Card-ID, the cumulative monetary amount for all previous allowed transactions for that card that satisfy the criteria specified in Country/URL, Town and Period must be below the monetary amount specified in the Cap column. In one embodiment, a 0 entry for Cap indicates that there is no maximum for the cumulative monetary amount.

Comment: Describes a row of data in the profile table. In the example of profile table 200, "Deny others" in the Comment column is included in the only data row that has an Allow value of 0. The "Deny others" comment indicates that transactions that do not satisfy the criteria criteria specified in the other data rows will be rejected.

One or more other columns that are not shown in FIG. 2 may be required to store information about the origin of dynamic profiling data that is sent by a TRS. For example, the profile table may have columns to store an identifier of the TRS (e.g., ReservationSystemIDref), a timestamp (e.g., creationTime) indicating the time the profiling data was created, and a history of changes made to the profiling data. As another example, the profile table may have one or more additional columns to indicate a geographic tolerance that extends the geographic area of the town, city or other geographic unit indicated in the Town column. The geographic tolerance may be, for instance, an identification of a point and a radius around the point, an indication of a polygon that includes a geographic buffer around the border of the geographic unit indicated in the Town column, or an indication one or more suburbs of the geographic unit indicated in the Town column.

The profile table or another database table may also store a complete description of the cardholder's trip, including all arrival and departure times for each leg of a trip and all stopover locations.

In another embodiment, one or more of the column names listed above may be replaced with other names in profile table 108 (see FIG. 1). Furthermore, in another embodiment one or more other columns may be included in profile table 108 (see FIG. 1) that are not included in sample profile table 200, or one or more columns included in sample profile table 200 may not be included in profile table 108 (see FIG. 1). For example, additional columns with identifiers of geographic units other than a country or town may be included in profile table 108 (see FIG. 1).

Figure 3A:
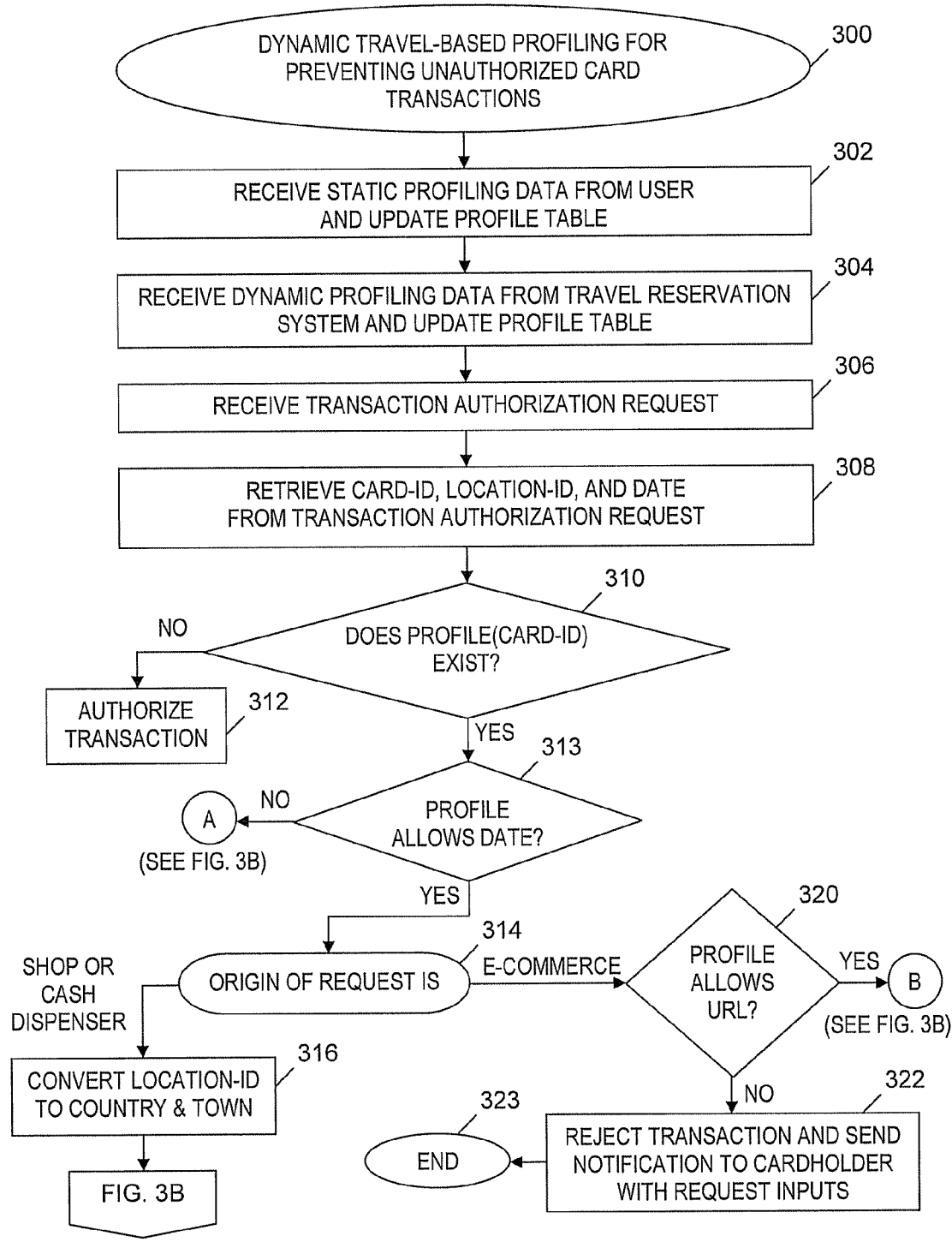
FIGS. 3A-3B is a flowchart of an unauthorized card transaction prevention process that uses dynamic itinerary-driven profiling and that is implemented in the system of FIG. 1, in accordance with embodiments of the present invention.
Figure 3B:
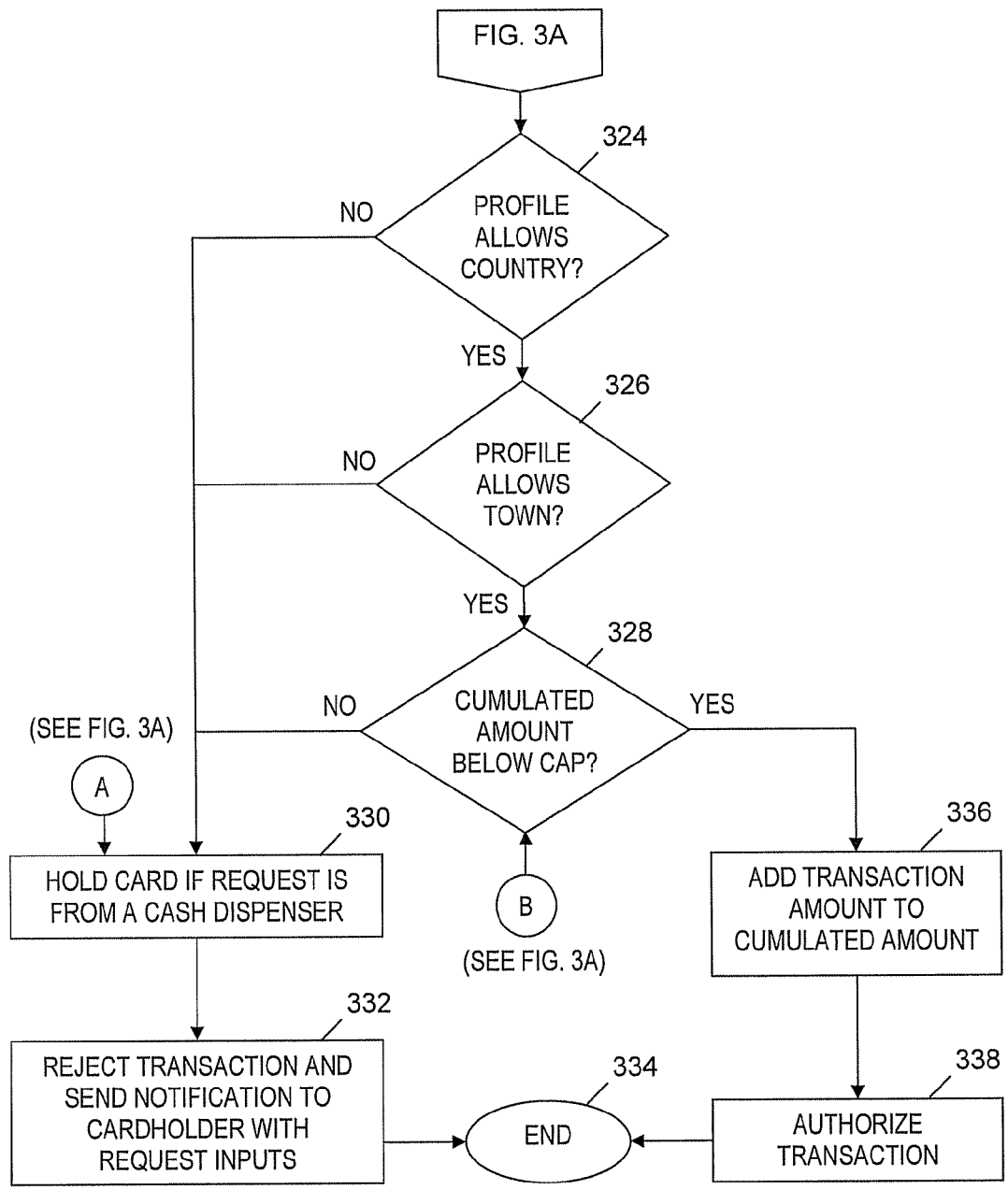

Process for Preventing Unauthorized Card Transactions via Dynamic Itinerary-Driven Profiling FIGS. 3A-3B is a flowchart of an unauthorized card transaction prevention process that uses dynamic itinerary-driven profiling and that is implemented in the system of FIG. 1, in accordance with embodiments of the present invention. The process of preventing unauthorized card transactions via dynamic itinerary-driven profiling starts at step 300. In step 302, authorization system 107 (see FIG. 1) receives static profiling data from user computing system 104 (see FIG. 1) and updates profile table 108 (see FIG. 1) with one or more authorization records that include the received static profiling data. The user provides the static profiling data via a web interface with strong authentication.

For example, the user provides the following profiling data in step 302: Vendor=URL1/Time=any/capping=300, where URL1 is the URL of acme.com. In this example, the profiling data is received by authorization system 107 (see FIG. 1) and stored as the second data row in profile table 200 (see FIG. 2).

In step 304, authorization system 107 (see FIG. 1) receives dynamic profiling data from travel reservation computing system 106 (see FIG. 1) and updates profile table 108 (see FIG. 1) with an authorization record that includes the received dynamic profiling data. The details of receiving and storing new dynamic profiling data are described below relative to FIG. 4. As one example of step 304, a TRS sends the following profiling data: Card-ID=123456789/User name=P. Dupont/Country=France/Town=Paris/Period=01/07-01/08/ Trip-ID=ID__1/Cap=no, which is received by the validation server and stored in the first data row of profile table 200 profile table 200 (see FIG. 2).

In step 306, authorization system 107 (see FIG. 1) receives a transaction authorization request (i.e., a request for an authorization of a card transaction) to initiate a card transaction. The transaction authorization request is received from a third-party requester system (i.e., a third-party payment system). Hereinafter, relative to the discussion of FIGS. 3A-3B, the transaction authorization request is also referred to simply as "the request." In one embodiment, the request is sent, via a computer network, to the validation server from a physical (i.e., offline or "bricks and mortar") shopping location, an e-commerce website, or a cash dispenser. Hereinafter, a physical shopping location is also referred to simply as a shop.

In step 308, authorization system 107 (see FIG. 1) retrieves from the request (1) an identification of the card being used in the card transaction (i.e., the retrieved card-ID), (2) a date of the transaction (i.e., the retrieved date), and (3) a URL address (i.e., the retrieved URL-ID) of an e-commerce website if the request is initiated by the website, or an identification of the location of the transaction (i.e., the retrieved location-ID) if the request is initiated by a shop or a cash dispenser. In one embodiment, the retrieved date is a timestamp that includes a date and a time at which the transaction is initiated.

If authorization system 107 (see FIG. 1) determines in step 310 that no data row in profile table 108 includes the retrieved card-ID in the Card-ID column, then the No branch of step 310 is taken and authorization system 107 (see FIG. 1) authorizes the transaction in step 312. Otherwise, in step 310, if authorization system 107 (see FIG. 1) identifies one or more data rows in profile table 108 that include the retrieved card-ID in the Card-ID column, then the Yes branch of branch of step 310 is taken, followed by step 313.

If authorization system 107 (see FIG. 1) determines in step 313 that a profile table data row identified in step 310 allows the date retrieved in step 308 (i.e., the retrieved date is included in the time period indicated by the data row), then the process of FIGS. 3A-3B continues with step 314. Step 313 includes authorization system 107 (see FIG. 1) comparing the retrieved date to authorized period(s) of time included in the authorization record(s) stored in profile table 108 (see FIG. 1). If the Yes branch of step 313 is taken, authorization system 107 (see FIG. 1) retrieves a set of one or more authorization records from profile table 108 (see FIG. 1) based on the comparison of the retrieved date to authorized period(s) of time in step 313. The one or more authorization records in the retrieved set of authorization record(s) include one or more authorized periods of time and one or more authorized geographic locations. Each authorization record includes one authorized period of time and one authorized geographic location. The set of one or more authorization records is retrieved because the aforementioned comparison in step 313 determined that each of the one or more authorized periods of time in the retrieved set includes the retrieved date. For example, in the first data row of profile table 200 (see FIG. 2), the entry of "01/07-01/08" (i.e., July 1 to August 1) in the Period column indicates that a retrieved date of July 15 is allowed because the July 1 to August 1 period of time includes the retrieved date of July 15.

Otherwise, if step 313 determines that no data row identified in step 310 allows the retrieved date, then the process of FIGS. 3A-3B continues with step 330 of FIG. 3B, which is described below.

If profile table 108 (see FIG. 1) includes timing tolerances, then step 313 compares the retrieved date to extended time period(s), where each extended time period is indicated by an authorization record's authorized period of time extended by the timing tolerance. In one embodiment, the start of an extended time period is the start of the authorized period of time minus the timing tolerance, and the end of the extended time period is the end of the authorized period of time plus the timing tolerance. Furthermore, if the profile table includes timing tolerances, the retrieved set of one or more authorization records is based on a determination that each of the extended time period(s) indicated by the authorized period(s) of time in the retrieved set includes the retrieved date.

In step 314, authorization system 107 (see FIG. 1) determines whether the request received in step 306 originated at (1) a shop, (2) a cash dispenser (e.g., an automated teller machine), or (3) an e-commerce website.

If authorization system 107 (see FIG. 1) determines in step 314 that the request received in step 306 originated at a shop or a cash dispenser, then the validation server converts the location-ID to a country identifier and a town (i.e., city) identifier in step 316 and the process of FIGS. 3A-3B continues with step 324 of FIG. 3B. In another embodiment, the location-ID may be converted into one more identifiers corresponding to geographic units other than a country and a town. In still another embodiment, the location-ID may be converted to a country identifier and/or a town identifier and to one or more additional identifiers of other geographic units. The identifiers resulting from step 316 are collectively referred to herein as the retrieved location.

Returning to step 314, if authorization system 107 (see FIG. 1) determines that the request received in step 306 originated at an e-commerce website, then the validation server determines the URL of the e-commerce website and the process continues with step 320. If authorization system 107 (see FIG. 1) determines in step 320 that a profile table data row identified in step 310 allows the URL determined in step 314, then the process continues with step 328 of FIG. 3B. For example, if the second data row of profile table 200 (see FIG. 2) is identified in step 310, then the URL for acme.com is allowed.

If authorization system 107 (see FIG. 1) determines in step 320 that no profile table data row identified in step 310 allows the URL determined in step 314, then the process continues with step 322. In step 322, authorization system 107 (see FIG. 1) identifies an unauthorized usage of the card, rejects the request received in step 306 (i.e., refuses payment for the e-commerce purchase), and sends notification 112 (see FIG. 1) (e.g., an SMS text message) to the cardholder for display on a display device, where the notification includes the input parameters retrieved or derived from the request (e.g., the retrieved date and retrieved location). In one embodiment, the notification 112 (see FIG. 1) sent in step 322 is displayed on a display device coupled to user computing system 104 (see FIG. 1). In another embodiment, the display device that displays notification 112 (see FIG. 1) is coupled to a computing unit that is not shown in FIG. 1 (e.g., a user's smartphone). Authorization system 107 (see FIG. 1) also stores an audit record in audit database table 114 (see FIG. 1), where the audit record includes the retrieved date and the retrieved location, and may also include the identification of the card and an identification of the third-party requester system that sent the transaction authorization request. In one embodiment, step 322 also In one embodiment, step 322 also includes validation server computing system 102 (see FIG. 1) sending a notification for display on a display device, where the notification includes the retrieved location and the retrieved date. For example, the notification is an SMS text message sent to and displayed on a user's smartphone. Following the rejection of the transaction authorization request in step 322, the unauthorized card transaction prevention process ends at step 323.

Returning to step 316, the next step is step 324 of FIG. 3B. If authorization system 107 (see FIG. 1) determines in step 324 that a profile table data row identified in step 310 (see FIG. 3A) allows the country identifier that resulted from step 316 (see FIG. 3A) (i.e., the geographic area indicated by the data row includes the country identified in the retrieved location), then the process of FIGS. 3A-3B continues with step 326. Step 324 includes authorization system 107 (see FIG. 1) comparing the country identifier in the retrieved location to country indicator(s) of authorized geographic location(s) included in the retrieved set of one or more authorization records (see step 313 of FIG. 3A). For example, in the first data row of table 200 in FIG. 2, the value of 33 in the Country/URL column indicates that a country identifier for France in a retrieved location is allowed because the value of 33 indicates a geographic area that includes the retrieved location.

Otherwise, if step 324 determines that no data row identified in step 310 (see FIG. 3A) allows the country identifier that resulted from step 316 (see FIG. 3A), then the process of FIGS. 3A-3B continues with step 330, which is described below.

If authorization system 107 (see FIG. 1) determines in step 326 that a profile table data data row identified in step 310 (see FIG. 3A) allows the town identifier that resulted from step 316 (see FIG. 3A) (i.e., the geographic area indicated by the data row includes the town identified in the retrieved location), then the process of FIGS. 3A-3B continues with step 328. Step 326 includes authorization system 107 (see FIG. 1) comparing the town identifier in the retrieved location to town indicator(s) of authorized geographic location(s) included in the retrieved set of one or more authorization records (see step 313 of FIG. 3A). For example, in the first data row of profile table 200 (see FIG. 2), "Paris" in the Town column indicates that a town identifier for Paris in a retrieved location is allowed because the authorized geographic location indicated by the data row includes the retrieved location.

Otherwise, if step 326 determines that no data row identified in step 310 (see FIG. 3A) allows the town identifier that resulted from step 316 (see FIG. 3A), then the process of FIGS. 3A-3B continues with step 330, which is described below.

Taking the Yes branches of steps 324 and 326 indicates that authorization system 107 (see FIG. 1) has (1) compared the retrieved location to the one or more authorized geographic locations included in the retrieved set of one or more authorization records (see step 313 of FIG. 3A), and (2) determined that the one or more authorized geographic locations do not include the retrieved location. The determination in (2) that the one or more authorized geographic locations do not include the retrieved location is based on the comparison in (1) of the retrieved location to the one or more authorized geographic locations.

If profile table 108 (see FIG. 1) includes geographic tolerances, then steps 324 and 326 compare the retrieved location to one or more geographic footprints indicated by the one or more authorization records of the retrieved set (see step 313 of FIG. 3A). A geographic footprint indicated by an authorization record is the geographic area of the authorization record's authorized geographic location extended by the geographic tolerance. Furthermore, if the profile table includes geographic tolerances, the aforementioned determination that the one or more authorized geographic locations do not include the retrieved location is also a determination that the one or more geographic footprints based on the geographic tolerances do not include the retrieved location.

If authorization system 107 (see FIG. 1) determines in step 328 that a cumulative monetary amount (a.k.a. cumulated amount) associated with a card identified in step 308 (see FIG. 3A) is not below a maximum amount included in the Cap column of a profile table data row identified in step 310 (see FIG. 3A), then the process of FIGS. 3A-3B continues with step 330. The cumulative monetary amount is the total of the monetary amounts for all previous allowed transactions for the card identified in step 308 (see FIG. 3A), where the allowed transactions satisfy the criteria specified data rows of profile table 108 (see FIG. 1) (e.g., the criteria in the Country/URL, Town and Period columns shown in FIG. 2).

In step 330, the card is held (i.e., not returned to the person who used the card) if the request received in step 306 (see FIG. 3A) is from a cash dispenser. In step 332, authorization system 107 (see FIG. 1) identifies an unauthorized usage of the cardholder's card, rejects the transaction authorization request received in step 306 (see FIG. 3A), and sends notification 112 (see FIG. 1) (e.g., an SMS text message) to the cardholder for display on a display device, where the notification includes input parameters retrieved or derived from the request (e.g., the country identifier and town identifier generated in step 316 of FIG. 3A and the date retrieved in step 308 of FIG. 3A). In one embodiment, the notification 112 (see FIG. 1) sent in step 332 is displayed on a display device coupled to user computing system 104 (see FIG. 1). In another embodiment, the display device that displays notification 112 (see FIG. 1) is coupled to a computing unit that is not shown in FIG. 1 (e.g., a user's smartphone). In step 332, authorization system 107 (see FIG. 1) also stores an audit record in audit database table 114 (see FIG. 1). The audit record includes the parameters that led to the identification of the unauthorized usage of the card (i.e., the retrieved location and the retrieved date), and may also include the identification of the card and an identification of the third-party requester system that sent the transaction authorization request.

Following step 332, the unauthorized card transaction prevention process ends at step 334. Again, step 330 also follows the No branch of step 313 (see FIG. 3A), the No branch of step 324 and the No branch of step 326.

Returning to step 328, if the authorization system 107 (see FIG. 1) determines that the cumulated amount associated with the card is below the maximum amount included in the Cap column of a data row identified in step 310 (see FIG. 3A), then the process of FIGS. 3A-3B continues with step 336. In step 336, authorization system 107 (see FIG. 1) adds the amount of the transaction to the cumulated amount. In step 338, authorization system 107 (see FIG. 1) identifies an authorized usage of the cardholder's card and authorizes the request received in step 306 (see FIG. 3A). In step 338, authorization system 107 (see FIG. 1) also stores an audit record in audit database table 114 (see FIG. 1). The audit record includes the parameters that led to the identification of the authorized usage of the card (i.e., the retrieved location and the retrieved date), and may also include the identification of the card and an identification of the third-party requester system that sent the transaction authorization request. Following step 338, the unauthorized card transaction prevention process ends at step 334.

In one embodiment, the notification sent in step 322 (see FIG. 3A) and/or the notification sent in step 332 may be stored in a computing data storage unit coupled to validation server 102 (see FIG. 1), user computing system 104 (see FIG. 1), or to another computing system.

Figure 4:
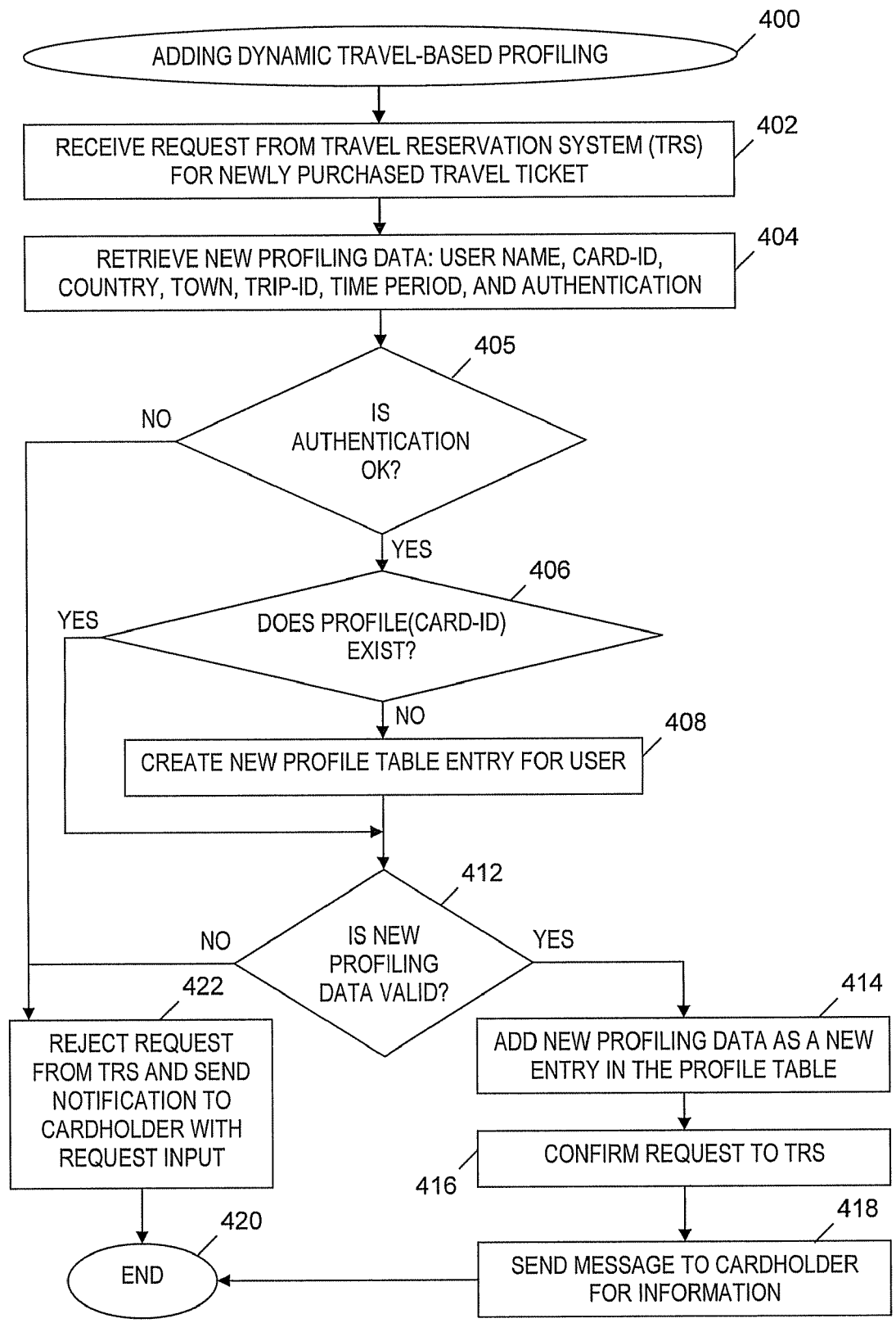
FIG. 4 is a flowchart of a process for adding dynamic itinerary-driven profiling that is used in the process of FIGS. 3A-3B, in accordance with embodiments of the present invention.

FIG. 4 is a flowchart of a process for adding dynamic itinerary-driven profiling that is used in the process of FIGS. 3A-3B, in accordance with embodiments of the present invention. The process for adding dynamic itinerary-driven profiling starts at step 400. In step 402, authorization system 107 (see FIG. 1) receives a request from the travel reservation computing system 106 (see FIG. 1) for one or more newly purchased travel tickets for a traveler's trip. Although the discussion of FIG. 4 describes a request received for newly purchased travel tickets, the present invention is not limited to travel tickets. The addition of dynamic profiling data in the present invention may be initiated by any type of geo-localized travel booking. In step 404, authorization system 107 (see FIG. 1) retrieves new dynamic profiling data that includes a name of the traveler who purchased the travel ticket(s) (i.e., user name), an identification of the card used to purchase the travel ticket(s) (i.e., card-ID), the country and town of a destination of the cardholder's trip, an identification of the cardholder's trip (i.e., trip-ID), a time period (e.g., a range of dates) of the trip during which the cardholder will be in the country and town, and an authentication.

In one embodiment, the authentication retrieved in step 404 is a signature (e.g., a hash code) generated on the record itself and a password. The same operation is performed by validation server 102 (see FIG. 1) with the locally saved password to match the signature.

In step 405, if authorization system 107 (see FIG. 1) verifies the authentication data retrieved in step 404, then the Yes branch of step 405 is taken and the process of FIG. 4 continues with step 406. Taking the Yes branch of step 405 includes verifying that the user name retrieved in step 404 matches the cardholder (i.e., verifying that the traveler who is purchasing the travel tickets is the cardholder).

If authorization system 107 (see FIG. 1) determines in step 406 that there are no data rows in profile table 108 (see FIG. 1) that include the card-ID retrieved in step 404, then in step 408 the validation server creates a new entry in profile table 108 for the cardholder. Otherwise, step 406 determines that there are one or more data rows in profile table 108 (see FIG. 1) that include the card-ID retrieved in step 404, the Yes branch of step 406 is taken, and the process of FIG. 4 continues with step 412. Step 412 also follows step 408.

In step 412, authorization system 107 (see FIG. 1) determines whether or not the new profiling data retrieved in step 404 is valid. The new profiling data retrieved in step 404 is valid if the new profiling data causes no conflict with other entries in profile table 108 (see FIG. 1). If step 412 determines that the new profiling data is valid, then in step 414, authorization system 107 (see FIG. 1) adds the new profiling data as a new entry in profile table 108 (see FIG. 1). In step 416, authorization system 107 (see FIG. 1) confirms the request (i.e., the request received in step 402) to the travel reservation computing system 106 (see FIG. 1). In step 418, authorization system 107 system 107 (see FIG. 1) sends a message to the cardholder for information, and the process of FIG. 4 ends at step 420.

Returning to step 412, if the authorization system 107 (see FIG. 1) determines that the new profiling data retrieved in step 404 is not valid, then in step 422 the validation server rejects the request from the travel reservation computing system (i.e., the request received in step 402) and sends a notification (e.g., an SMS instant message) to the cardholder for display on a display device, where the notification includes the request's input parameters (e.g., country, town, and time period retrieved in step 404). Following step 422, the process of FIG. 4 ends at step 420.

Returning to step 405, if the authorization system 107 (see FIG. 1) does not verify the authentication retrieved in step 404, then the No branch of step 405 is taken and the process of FIG. 4 continues with step 422, as described above. Following step 422, the process of FIG. 4 ends at step 420.

Figure 5:
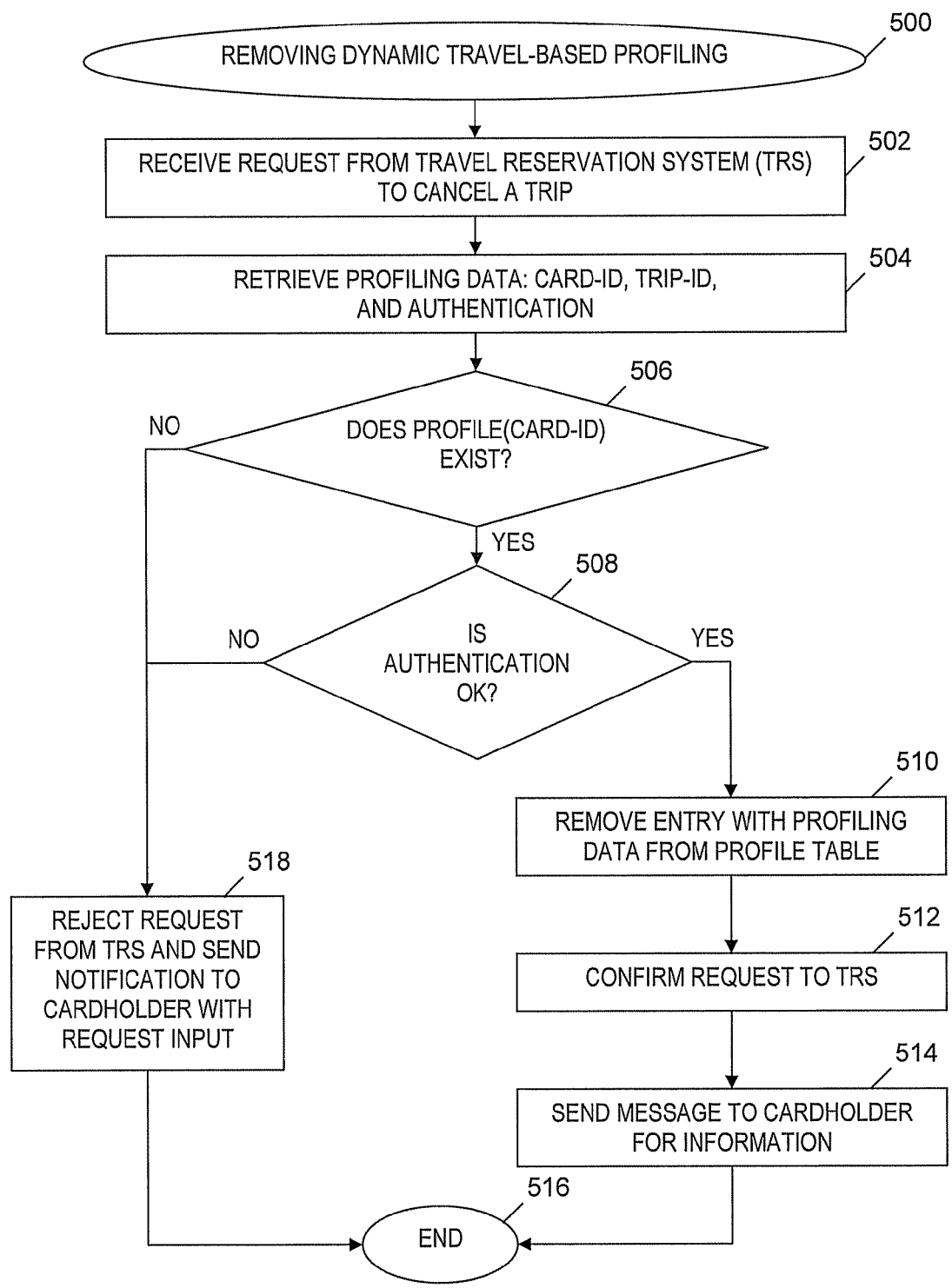
FIG. 5 is a flowchart of a process for removing dynamic itinerary-driven profiling that is used in the process of FIGS. 3A-3B, in accordance with embodiments of the present invention.

FIG. 5 is a flowchart of a process for removing dynamic itinerary-driven profiling that is used in the process of FIGS. 3A-3B, in accordance with embodiments of the present invention. The process for removing dynamic itinerary-driven profiling starts at step 500. In step 502, authorization system 107 (see FIG. 1) receives a request from the travel reservation computing system 106 (see FIG. 1) for a cancellation of a cardholder's previously purchased travel ticket(s). Although the discussion of FIG. 5 describes a request received for a cancellation of previously purchased travel tickets, the present invention is not limited to travel tickets. The removal of dynamic profiling data may be initiated by a cancellation of any type of geo-localized travel travel booking. In step 504, authorization system 107 (see FIG. 1) retrieves profiling data that includes an identification of the card that was used to purchase the travel ticket(s) (i.e., card-ID), an identification of the cardholder's trip (i.e., trip-ID), and an authentication.

In one embodiment, the authentication retrieved in step 504 is a signature (e.g., a hash code) generated on the record itself and a password. The same operation is performed by validation server 102 (see FIG. 1) with the locally saved password to match the signature.

If authorization system 107 (see FIG. 1) determines in step 506 that there are one or more data rows in profile table 108 (see FIG. 1) that include the card-ID retrieved in step 504, then the process of FIG. 5 continues with step 508.

In step 508, if authorization system 107 (see FIG. 1) verifies the authentication retrieved in step 504, then the process of FIG. 5 continues with step 510. In step 510, authorization system 107 (see FIG. 1) removes the entry in profile table 108 (see FIG. 1) that includes the profile data retrieved in step 504. In step 512, authorization system 107 (see FIG. 1) confirms the request (i.e., the request received in step 502) to the travel reservation computing system 106 (see FIG. 1). In step 514, authorization system 107 (see FIG. 1) sends a message to the cardholder for information, and the process of FIG. 5 ends at step 516.

Returning to step 508, if the authorization system 107 (see FIG. 1) does not verify the authentication retrieved in step 504, then the process of FIG. 5 continues with step 518. In step 518, authorization system 107 (see FIG. 1) rejects the request from the travel reservation computing system 106 (see FIG. 1) (i.e., the request received in step 502), and sends a notification (e.g., an SMS text message) to the cardholder for display on a display device, where the the notification includes the input parameters of the request (e.g., trip-ID). Following step 518, the process of FIG. 5 ends at step 516.

Returning to step 506, if authorization system 107 (see FIG. 1) determines that there are no data rows in profile table 108 (see FIG. 1) that include the card-ID retrieved in step 504, the No branch of step 506 is taken, the process of FIG. 5 continues with step 518 (as described above). After step 518, the process of FIG. 5 ends at step 516.

Computing System

Figure 6:
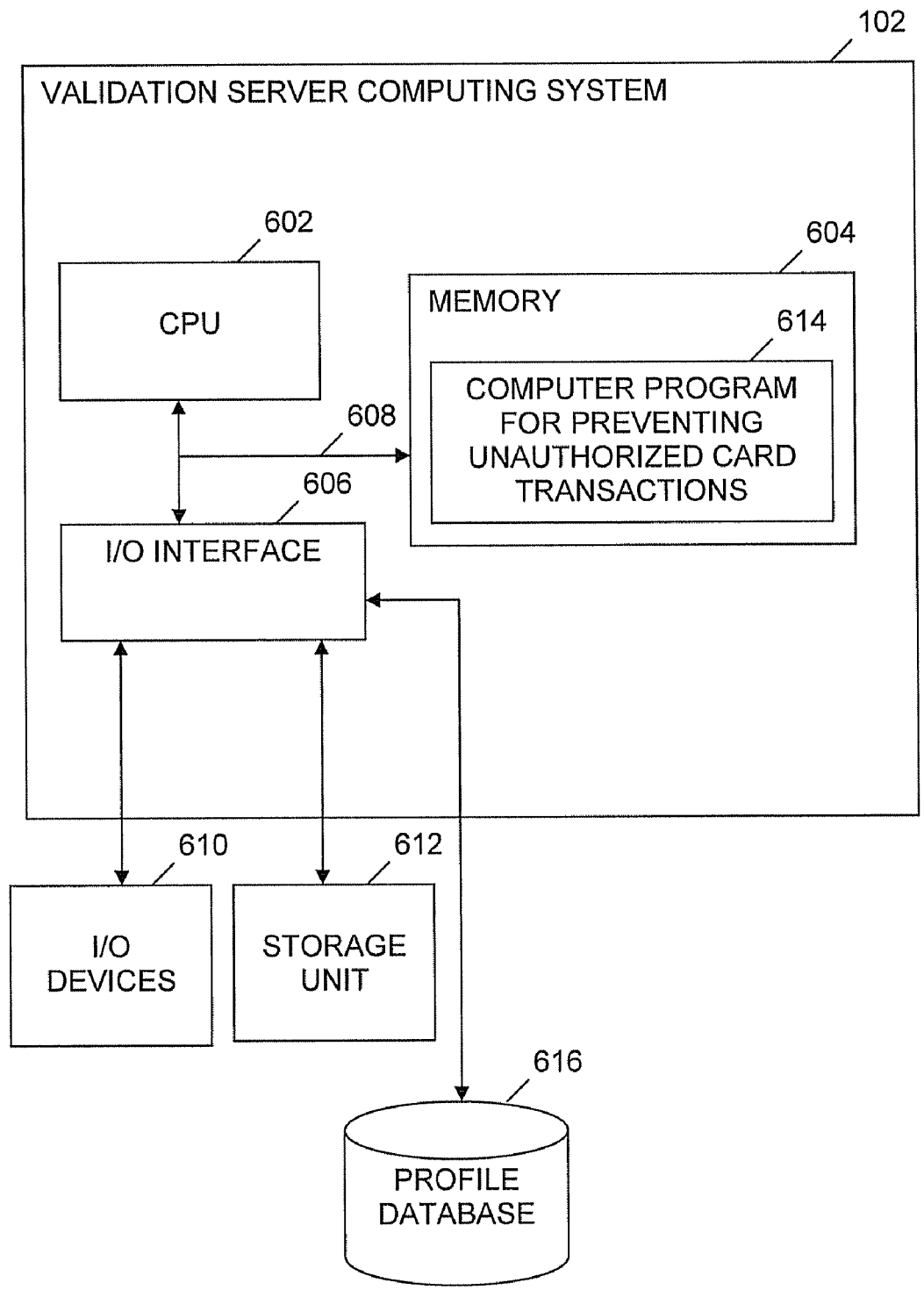
FIG. 6 is a block diagram of a computing system that is included in the system of FIG. 1 and that implements the processes of FIGS. 3A-3B, FIG. 4 and FIG. 5, in accordance with embodiments of the present invention.

FIG. 6 is a block diagram of a computing system that is included in the system of FIG. 1 and that implements the processes of FIGS. 3A-3B, FIG. 4 and FIG. 5, in accordance with embodiments of the present invention. Validation server computing system 102 generally comprises a central processing unit (CPU) 602, a memory 604, an input/output (I/O) interface 606, and a bus 608. Further, computing system 102 is coupled to I/O devices 610 and a computer data storage unit 612. CPU 602 performs computation and control functions of computing system 102. CPU 602 may comprise a single processing unit, or be distributed across one or more processing units in one or more locations (e.g., on a client and server).

Memory 604 may comprise any known type of computer data storage and/or transmission media, including bulk storage, magnetic media, optical media, random access memory (RAM), read-only memory (ROM), a data cache, a data object, etc. In one embodiment, cache memory elements of memory 604 provide temporary storage of at least some program code in order to reduce the number of times code must be retrieved from bulk storage during execution. Moreover, similar to CPU 602, memory 604 may reside at a single physical location, comprising one or more types of data storage, or be distributed across a plurality of physical systems in various forms. Further, memory 604 can include data distributed across, for example, a local area network (LAN) or a wide area network (WAN).

I/O interface 606 comprises any system for exchanging information to or from an external source. I/O devices 610 comprise any known type of external device, including a display device (e.g., monitor), keyboard, mouse, printer, speakers, handheld device, facsimile, etc. Bus 608 provides a communication link between each of the components in computing system 102, and may comprise any type of transmission link, including electrical, optical, wireless, etc.

I/O interface 606 also allows computing system 102 to store and retrieve information (e.g., program instructions or data) from an auxiliary storage device such as computer data storage unit 612. Computer data storage unit 612 may be a non-volatile storage device, such as a magnetic disk drive (i.e., hard disk drive) or an optical disc drive (e.g., a CD-ROM drive which receives a CD-ROM disk).

Memory 604 includes computer program code 614 that provides the logic for preventing unauthorized card transactions via dynamic itinerary-driven profiling (e.g., the process of FIGS. 3A-3B) and for adding and removing dynamic itinerary-driven profiling (e.g., the processes of FIG. 4 and FIG. 5). In one embodiment, code 614 is included in authorization system 107 (see FIG. 1). Further, memory 604 may include other systems not shown in FIG. 6, such as an operating system (e.g., Linux) that runs on CPU 602 and provides control of various components components within and/or connected to computing system 102.

Profile table 108 (see FIG. 1) is stored in a profiles database 616, which may reside in storage unit 612 or in another computer data storage unit (not shown) that is coupled to computing system 102 or to another computing system (not shown).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system" (e.g., system 100 or computing system 102). Furthermore, the present invention may take the form of a computer program product embodied in any tangible medium of expression (e.g., memory 604 or computer data storage unit 612) having computer-usable program code (e.g., code 614) embodied in the medium.

Any combination of one or more computer-usable or computer-readable medium(s) (e.g., memory 604 and computer data storage unit 612) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program 614 is printed, as the program 614 can be electronically captured via, for instance, optical scanning of the paper or other medium, then compiled, interpreted, or otherwise processed in a suitable manner, if necessary, and then stored in a computer memory 604. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., code 614) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer (e.g., computing system 102), partly on the user's computer, as a stand-alone software package, partly on the user's computer and partly on a remote computer or entirely on the remote computer or server. In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 3A-3B, FIG. 4 and FIG. 5) and/or block diagrams of methods, apparatus (systems) (e.g., FIG. 1 and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 614). These computer program instructions may be provided to a processor (e.g., CPU 602) of a general purpose computer (e.g., computing system 102), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 604 or computer data storage unit 612) that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computing system 102) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of the present invention can be deployed, managed, serviced, etc. by a service provider that offers to deploy or integrate computing infrastructure with respect to the method of preventing unauthorized card transactions via dynamic itinerary-driven profiling. Thus, the present invention discloses a process for supporting computer infrastructure, comprising integrating, hosting, maintaining and deploying computer-readable code (e.g., code 614) into a computing system (e.g., computing system 102), wherein the code in combination with the computing system is capable of performing a method of preventing unauthorized card transactions via dynamic itinerary-driven profiling.

In another embodiment, the invention provides a business method that performs the process steps of the invention on a subscription, advertising and/or fee basis. That is, a service provider, such as a Solution Integrator, can offer to create, maintain, support, etc. a method of preventing unauthorized card transactions via dynamic itinerary-driven profiling. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 3A-3B, FIG. 4 and FIG. 5, and the block diagrams in FIG. 1 and FIG. 6 illustrate the architecture, functionality, and operation of possible implementations of systems, methods, and computer program products according to various embodiments of the present invention. In this regard, each block in the flowchart or block diagrams may represent a module, segment, or portion of code (e.g., code 614), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of preventing an unauthorized card transaction via dynamic itinerary-driven profiling, comprising:

receiving, by a first computing system and from a travel reservation system (TRS) executing on a second computing system, an authorization record, wherein said authorization record includes an identifier of a cardholder to whom a card is issued, an identifier of said card, one or more identifiers that specify an authorized geographic location, an identification of a travel itinerary associated with a trip to be taken by said cardholder, an authorized period of time, and an authorization indicator that indicates that a usage of said card in said authorized geographic location in said authorized period of time is granted, wherein said card is a credit card or a debit card, wherein said card is used by said cardholder for a purchase, via said TRS, of one or more geo-localized travel bookings that specify said travel itinerary, and wherein said travel itinerary specifies that in said trip said cardholder is scheduled to be in said authorized geographic location for said authorized period of time;

storing, by said first computing system and in response to said receiving said authorization record, said authorization record in a profile table included in a database residing on a computer data storage unit;

receiving, by said first computing system and subsequent to said storing, a request for an authorization of a card transaction that is initiated via a usage of said card;

retrieving, by said first computing system, from said request, and in response to said receiving said request for said authorization, said identifier of said card, an identifier of a retrieved location in which said card transaction is initiated and a retrieved date on which said card transaction is initiated;

determining a rejection condition by said first computing system and subsequent to said retrieving from said request, wherein said determining said rejection condition includes:

comparing said retrieved date to said authorized period of time included in said authorization record and to any other authorized period of time included in any other authorization record stored in said profile table;

retrieving one or more authorization records from said profile table based on a result of said comparing said retrieved date, wherein said one or more authorization records include one or more authorized periods of time and one or more authorized geographic locations, wherein each authorized period of time includes said retrieved date, wherein said authorization record is included in said one or more authorization records, wherein said authorized period of time is included in said one or more authorized periods of time, and wherein said authorized geographic location is included in said one or more authorized geographic locations;

comparing said retrieved location to said one or more authorized geographic locations; and determining that said one or more authorized geographic locations do not include said retrieved location based on a result of said comparing said retrieved location;

rejecting, by said first computing system and in response to said determining said rejection condition, said card transaction; and sending, by said first computing system and subsequent to said determining said rejection condition, a notification for display on a display device, wherein said notification includes said retrieved location and said retrieved date.

2. The method of claim 1, further comprising:
purchasing, prior to said receiving said authorization record and via said TRS, said one or more geo-localized travel bookings, wherein said purchasing includes using said card for a payment for said one or more geo-localized travel bookings,
wherein said receiving said authorization record includes receiving a request for an addition of said authorization record to said profile table, wherein said request includes a set of profiling data and an authentication, and wherein said set of profiling data includes said identifier of said cardholder, said identifier of said card, said one or more identifiers that specify said authorized geographic location, said identification of said travel itinerary, and said authorized period of time;
retrieving, by said first computing system, from said request for said addition of said authorization record, and subsequent to said receiving said request for said addition of said authorization record, said set of profiling data and said authentication;
verifying said authentication by said first computing system and subsequent to said retrieving said authentication; and
validating said set of profiling data by said first computing system and subsequent to said retrieving said set of profiling data,
wherein said storing said authorization record includes adding, subsequent to said validating, said set of profiling data as said authentication record in said profile table.

3. The method of claim 1, further comprising:
receiving, by said first computing system, a request from said TRS for a cancelation of said travel itinerary;
retrieving, by said first computing system, from said request for said cancelation, and subsequent to said receiving said request for said cancelation, a set of profiling data and an authentication, wherein said set of profiling data includes said identifier of said card and said identification of said travel itinerary;
determining, by said first computing system, that said identifier of said card is included in said authentication record in said profile table;
verifying said authentication by said first computing system and subsequent to said retrieving said authentication; and
removing, subsequent to said verifying said authentication, said authentication record from said profile table.

4. The method of claim 1, wherein said one or more authorization records further include one or more tolerance values, wherein said one or more timing tolerance values indicate one or more tolerances for said one or more authorized periods of time, wherein said comparing said retrieved date includes comparing said retrieved date to an extended period of time associated with said authorization record and to any other extended period of time associated with any other authorization record stored in said profile table, wherein said extended period of time is indicated by a start of said authorized period of time minus a timing tolerance value of said one or more timing tolerance values and by an end of said authorized period of time plus said timing tolerance value, wherein said retrieving said one or more authorization records is further based on a result of said comparing said retrieved date to said extended period of time and to said any other extended period of time, and wherein said extended period of time and said any other extended period of time include said retrieved date.

5. The method of claim 1, wherein said one or more authorization records further include one or more geographic tolerance values, wherein said one or more geographic tolerance values indicate one or more tolerances for said one or more authorized geographic locations, wherein said comparing said retrieved location includes comparing said retrieved location to a geographic footprint associated with said authorization record and to any other geographic footprint associated with any other authorization record included in said one or more authorization records, wherein said geographic footprint is said authorized geographic location extended by an operation that utilizes a geographic tolerance value of said one or more geographic tolerance values, wherein said determining that said one or more authorized geographic locations do not include said retrieved location is further based on a result of said comparing said retrieved location to said geographic footprint and to said any other geographic footprint, and wherein said determining that said one or more authorized geographic locations do not include said retrieved location includes determining that said geographic footprint and said any other geographic footprint do not include said retrieved location.

6. The method of claim 1, further comprising:
receiving, by said first computing system, a notification of a change of an arrival or a departure of a mode of transportation used in said travel itinerary; and
automatically updating, by said first computing system in real-time and in response to said receiving said notification of said change, said authorized period of time based on said change.

7. The method of claim 1, further comprising:
receiving, by said first computing system and subsequent to said storing, a second request for an authorization of a second card transaction that is initiated via a second usage of said card;
retrieving, by said first computing system, from said second request, and subsequent to said receiving said second request for said authorization, said identifier of said card, an identifier of a second retrieved location, and a second retrieved date;
determining an acceptance condition by said first computing system and subsequent to said retrieving from said second request, wherein said determining said acceptance condition includes:
comparing said second retrieved date to said authorized period of time included in said authorization record and to any other authorized period of time included in any other authorization record stored in said profile table;
retrieving a second set of one or more authorization records from said profile table based on a result of said comparing said second retrieved date, wherein said second set of one or more authorization records includes a second set of one or more authorized periods of time and a second set of one or more authorized geographic locations, wherein each authorized period of time of said second set of one or more authorized periods of time includes said second retrieved date;
comparing said second retrieved location to said authorized geographic location included in said second set of one or more authorized geographic locations; and
determining that said authorized geographic location includes said second retrieved location based on a result of said comparing said second retrieved location; and authorizing, by said first computing system and in response to said determining said acceptance condition, said second card transaction.

8. The method of claim 1, further comprising storing, subsequent to said determining said rejection condition, an audit record in a database residing on a computer data storage device, wherein said audit record includes said retrieved location and said retrieved date.

9. A first computing system comprising a processor and a computer-readable memory unit coupled to said processor, said memory unit containing instructions that when executed by said processor implement a method of preventing an unauthorized card transaction via dynamic itinerary-driven profiling, said method comprising:

receiving, from a travel reservation system (TRS) executing on a second computing system, an authorization record, wherein said authorization record includes an identifier of a cardholder to whom a card is issued, an identifier of said card, one or more identifiers that specify an authorized geographic location, an identification of a travel itinerary associated with a trip to be taken by said cardholder, an authorized period of time, and an authorization indicator that indicates that a usage of said card in said authorized geographic location in said authorized period of time is granted, wherein said card is a credit card or a debit card, wherein said card is used by said cardholder for a purchase, via said TRS, of one or more geo-localized travel bookings that specify said travel itinerary, and wherein said travel itinerary specifies that in said trip said cardholder is scheduled to be in said authorized geographic location for said authorized period of time;

storing, in response to said receiving said authorization record, said authorization record in a profile table included in a database residing on a computer data storage unit;

receiving, subsequent to said storing, a request for an authorization of a card transaction that is initiated via a usage of said card;

retrieving, from said request and in response to said receiving said request for said authorization, said identifier of said card, an identifier of a retrieved location in which said card transaction is initiated and a retrieved date on which said card transaction is initiated;

determining a rejection condition subsequent to said retrieving from said request, wherein said determining said rejection condition includes:

comparing said retrieved date to said authorized period of time included in said authorization record and to any other authorized period of time included in any other authorization record stored in said profile table;

retrieving one or more authorization records from said profile table based on a result of said comparing said retrieved date, wherein said one or more authorization records include one or more authorized periods of time and one or more authorized geographic locations, wherein each authorized period of time includes said retrieved date, wherein said authorization record is included in said one or more authorization records, wherein said authorized period of time is included in said one or more authorized periods of time, and wherein said authorized geographic location is included in said one or more authorized geographic locations;

comparing said retrieved location to said one or more authorized geographic locations; and determining that said one or more authorized geographic locations do not include said retrieved location based on a result of said comparing said retrieved location;

rejecting, in response to said determining said rejection condition, said card transaction; and sending, subsequent to said determining said rejection condition, a notification for display on a display device, wherein said notification includes said retrieved location and said retrieved date.

10. The system of claim 9, wherein said method further comprises:

purchasing, prior to said receiving said authorization record and via said TRS, said one or more geo-localized travel bookings, wherein said purchasing includes using said card for a payment for said one or more geo-localized travel bookings, wherein said receiving said authorization record includes receiving a request for an addition of said authorization record to said profile table, wherein said request includes a set of profiling data and an authentication, and wherein said set of profiling data includes said identifier of said cardholder, said identifier of said card, said one or more identifiers that specify said authorized geographic location, said identification of said travel itinerary, and said authorized period of time;

retrieving, from said request for said addition of said authorization record and subsequent to said receiving said request for said addition of said authorization record, said set of profiling data and said authentication;

verifying said authentication subsequent to said retrieving said authentication; and validating said set of profiling data subsequent to said retrieving said set of profiling data, wherein said storing said authorization record includes adding, subsequent to said validating, said set of profiling data as said authentication record in said profile table.

11. The system of claim 9, wherein said method further comprises:

receiving a request from said TRS for a cancelation of said travel itinerary;

retrieving, from said request for said cancelation and subsequent to said receiving said request for said cancelation, a set of profiling data and an authentication, wherein said set of profiling data includes said identifier of said card and said identification of said travel itinerary;

determining that said identifier of said card is included in said authentication record in said profile table;

verifying said authentication subsequent to said retrieving said authentication; and removing, subsequent to said verifying said authentication, said authentication record from said profile table.

12. A computer program product, comprising a computer-readable, tangible storage device having a computer-readable program code stored therein, said computer-readable program code containing instructions that when executed by a processor of a first computing system implement a method of preventing an unauthorized card transaction via dynamic itinerary-driven profiling, said method comprising:

receiving, from a travel reservation system (TRS) executing on a second computing system, an authorization record, wherein said authorization record includes an identifier of a cardholder to whom a card is issued, an identifier of said card, one or more identifiers that specify an authorized geographic location, an identification of a travel itinerary associated with a trip to be taken by said cardholder, an authorized period of time, and an authorization indicator that indicates that a usage of said card in said authorized geographic location in said authorized period of time is granted, wherein said card is a credit card or a debit card, wherein said card is used by said cardholder for a purchase, via said TRS, of one or more geo-localized travel bookings that specify said travel itinerary, and wherein said travel itinerary specifies that in said trip said cardholder is scheduled to be in said authorized geographic location for said authorized period of time;

storing, in response to said receiving said authorization record, said authorization record in a profile table included in a database residing on a computer data storage unit;

receiving, subsequent to said storing, a request for an authorization of a card transaction that is initiated via a usage of said card;

retrieving, from said request and in response to said receiving said request for said authorization, said identifier of said card, an identifier of a retrieved location in which said card transaction is initiated and a retrieved date on which said card transaction is initiated;

determining a rejection condition subsequent to said retrieving from said request, wherein said determining said rejection condition includes:
   comparing said retrieved date to said authorized period of time included in said authorization record and to any other authorized period of time included in any other authorization record stored in said profile table;
   retrieving one or more authorization records from said profile table based on a result of said comparing said retrieved date, wherein said one or more authorization records include one or more authorized periods of time and one or more authorized geographic locations, wherein each authorized period of time includes said retrieved date, wherein said authorization record is included in said one or more authorization records, wherein said authorized period of time is included in said one or more authorized periods of time, and wherein said authorized geographic location is included in said one or more authorized geographic locations;
   comparing said retrieved location to said one or more authorized geographic locations; and
   determining that said one or more authorized geographic locations do not include said retrieved location based on a result of said comparing said retrieved location;

rejecting, in response to said determining said rejection condition, said card transaction; and sending, subsequent to said determining said rejection condition, a notification for display on a display device, wherein said notification includes said retrieved location and said retrieved date.

13. The program product of claim 12, wherein said method further comprises:
   purchasing, prior to said receiving said authorization record and via said TRS, said one or more geo-localized travel bookings, wherein said purchasing includes using said card for a payment for said one or more geo-localized travel bookings,
   wherein said receiving said authorization record includes receiving a request for an addition of said authorization record to said profile table, wherein said request includes a set of profiling data and an authentication, and wherein said set of profiling data includes said identifier of said cardholder, said identifier of said card, said one or more identifiers that specify said authorized geographic location, said identification of said travel itinerary, and said authorized period of time;
   retrieving, from said request for said addition of said authorization record and subsequent to said receiving said request for said addition of said authorization record, said set of profiling data and said authentication;
   verifying said authentication subsequent to said retrieving said authentication; and
   validating said set of profiling data subsequent to said retrieving said set of profiling data,
   wherein said storing said authorization record includes adding, subsequent to said validating, said set of profiling data as said authentication record in said profile table.

14. The program product of claim 12, wherein said method further comprises:
   receiving a request from said TRS for a cancelation of said travel itinerary;
   retrieving, from said request for said cancelation and subsequent to said receiving said request for said cancelation, a set of profiling data and an authentication, wherein said set of profiling data includes said identifier of said card and said identification of said travel itinerary;
   determining that said identifier of said card is included in said authentication record in said profile table;
   verifying said authentication subsequent to said retrieving said authentication; and
   removing, subsequent to said verifying said authentication, said authentication record from said profile table.

15. The program product of claim 12, wherein said one or more authorization records further include one or more tolerance values, wherein said one or more timing tolerance values indicate one or more tolerances for said one or more authorized periods of time, wherein said comparing said retrieved date includes comparing said retrieved date to an extended period of time associated with said authorization record and to any other extended period of time associated with any other authorization record stored in said profile table, wherein said extended period of time is indicated by a start of said authorized period of time minus a timing tolerance value of said one or more timing tolerance values and by an end of said authorized period of time plus said timing tolerance value, wherein said retrieving said one or more authorization records is further based on a result of said comparing said retrieved date to said extended period of time and to said any other extended period of time, and wherein said extended period of time and said any other extended period of time include said retrieved date.

16. The program product of claim 12, wherein said one or more authorization records further include one or more geographic tolerance values, wherein said one or more geographic tolerance values indicate one or more tolerances for said one or more authorized geographic locations, wherein said comparing said retrieved location includes comparing said retrieved location to a geographic footprint associated with said authorization record and to any other geographic footprint associated with any other authorization record included in said one or more authorization records, wherein said geographic footprint is said authorized geographic location extended by an operation that utilizes a geographic tolerance value of said one or more geographic tolerance values, wherein said determining that said one or more authorized geographic locations do not include said retrieved location is further based on a result of said comparing said retrieved location to said geographic footprint and to said any other geographic footprint, and wherein said determining that said one or more authorized geographic locations do not include said retrieved location includes determining that said geographic footprint and said any other geographic footprint do not include said retrieved location.

17. The program product of claim 12, wherein said method further comprises:
   receiving a notification of a change of an arrival or a departure of a mode of transportation used in said travel itinerary; and
   automatically updating, in real-time and in response to said receiving said notification of said change, said authorized period of time based on said change.

18. The program product of claim 12, wherein said method further comprises:
   receiving, subsequent to said storing, a second request for an authorization of a second card transaction that is initiated via a second usage of said card;
   retrieving, from said second request and subsequent to said receiving said second request for said authorization, said identifier of said card, an identifier of a second retrieved location, and a second retrieved date;
   determining an acceptance condition subsequent to said retrieving from said second request, wherein said determining said acceptance condition includes:
      comparing said second retrieved date to said authorized period of time included in said authorization record and to any other authorized period of time included in any other authorization record stored in said profile table;
      retrieving a second set of one or more authorization records from said profile table based on a result of said comparing said second retrieved date, wherein said second set of one or more authorization records includes a second set of one or more authorized periods of time and a second set of one or more authorized geographic locations, wherein each authorized period of time of said second set of one or more authorized periods of time includes said second retrieved date;
      comparing said second retrieved location to said authorized geographic location included in said second set of one or more authorized geographic locations; and
      determining that said authorized geographic location includes said second retrieved location based on a result of said comparing said second retrieved location; and
   authorizing, in response to said determining said acceptance condition, said second card transaction.

* * * * *